United States Patent
Kimura et al.

(10) Patent No.: US 6,299,718 B1
(45) Date of Patent: *Oct. 9, 2001

(54) METHOD OF MANUFACTURING A CYLINDRICAL PART BY FIBER REINFORCED PLASTIC COMPOSITE MATERIAL

(75) Inventors: Minoru Kimura, Kobe; Haruko Nagai, Utsunomiya; Yumi Ito, Utsunomiya; Naoya Takizawa, Utsunomiya; Takashi Nagumo, Utsunomiya, all of (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/348,014

(22) Filed: Jul. 6, 1999

Related U.S. Application Data

(62) Division of application No. 08/870,419, filed on Jun. 5, 1997, now Pat. No. 5,985,073.

(30) Foreign Application Priority Data

Jun. 13, 1996 (JP) .................................................. 8-152458

(51) Int. Cl.[7] .................................................. B65H 81/00
(52) U.S. Cl. .................... 156/173; 156/171; 156/175; 156/184; 156/188; 156/190; 156/195
(58) Field of Search .................................... 156/172, 169, 156/173, 171, 184, 188, 195, 245, 190, 175; 464/181; 74/572

(56) References Cited

U.S. PATENT DOCUMENTS

| | | |
|---|---|---|
| 2,753,705 | 7/1956 | Quartier . |
| 3,602,067 * | 8/1971 | Wetherbee .............................. 74/572 |
| 4,089,190 * | 5/1978 | Worgan et al. .................. 464/181 X |
| 4,273,601 | 6/1981 | Weingart . |
| 4,591,400 | 5/1986 | Fradenburgh . |
| 4,605,385 * | 8/1986 | Puck et al. ........................... 464/181 |
| 5,549,947 | 8/1996 | Quigley . |

FOREIGN PATENT DOCUMENTS

| | | |
|---|---|---|
| 2142015 * | 4/1972 | (DE) . |
| 55-93418 * | 7/1980 | (JP) . |
| 2-236014 * | 9/1990 | (JP) . |

* cited by examiner

*Primary Examiner*—Jeff H. Aftergut
(74) *Attorney, Agent, or Firm*—Smith, Gambrell & Russell, LLP

(57) ABSTRACT

The disclosed method can manufacture a thick-walled cylindrical part of an excellent quality which is free from the interlayer separation, by using a fiber reinforced plastic composite material. The fiber reinforced plastic composite material having a small thermal expansion coefficient is laminated in the circumferential direction of a mandrel; the laminated fiber reinforced plastic composite material layer is heat-cured to form an auxiliary member of the mandrel; a plurality of sorts of fiber reinforced plastic composite materials having a different elastic modulus, respectively are laminated on the formed auxiliary member; and the laminated fiber reinforced plastic composite materials are all heat-cured.

4 Claims, 3 Drawing Sheets

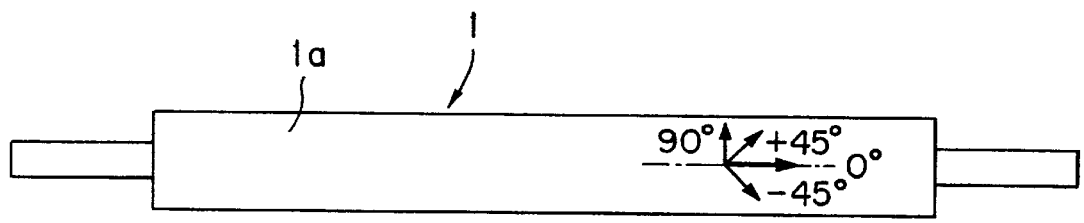
F I G. 1
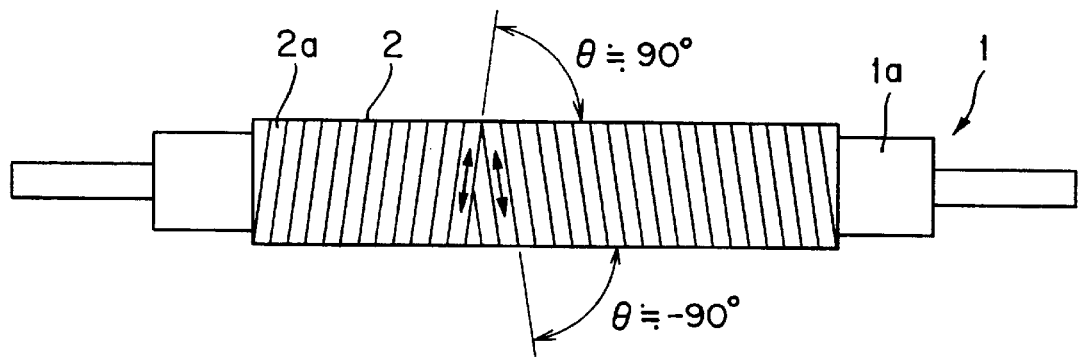
F I G. 2

ANALYSIS EXAMPLE OF STRESS DISTRIBUTION IN RADIUS DIRECTION

METHOD OF MANUFACTURING A CYLINDRICAL PART BY FIBER REINFORCED PLASTIC COMPOSITE MATERIAL

REFERENCE TO A RELATED APPLICATION

This application is a divisional application of parent application Ser. No. 08/870,419 filed Jun. 5, 1997, now U.S. Pat. No. 5,985,073 which is relied on and incorporated herein by reference.

BACKGROUND OF THE INVENTION

1. Field of the Invention

The present invention relates to a cylindrical part manufactured by fiber reinforced plastic composite material so as to be used as a structural member, and a method of manufacturing the same cylindrical part by fiber reinforced plastic composite material.

2. Description of the Related Art

The fiber reinforced plastic composite material is excellent in specific strength, specific rigidity and corrosion resistance. However, there still exist various technical problems to be solved when a structural member is manufactured by fiber reinforced plastic composite material.

When a thick-walled cylindrical part is manufactured by the fiber reinforced plastic composite material, various methods such as the filament winding method, tape winding method, sheet winding method, and etc. are now being adopted.

However, the fiber reinforced plastic composite material is provided with such characteristics that a thermal expansion coefficient thereof differs largely according to the lamination direction. Therefore, when a thick-walled cylindrical part is manufactured by the fiber reinforced plastic composite material, internal stress proportional to a difference between the curing temperature and room temperature is inevitably generated in the fiber reinforced plastic composite material, after being heated for curing. In the case of the thick-walled cylindrical part, there exists the case where the internal stress generated in the fiber reinforced plastic composite material exceeds an interlayer bonding strength of the fiber reinforced plastic composite material. In this case, an interlayer separation occurs in the fiber reinforced plastic composite material.

In a general laminating process of thick-walled cylindrical parts, many lamination angles of ±10°/±45°/±85° are combined with each other. In this case, when a diameter of the cylindrical part is small (e.g., less than 200 mm) and the wall thickness is large (e.g., more than 30 mm), since the internal stress becomes excessively large, there exists a problem in that the interlayer separation occurs.

To overcome this problem related to the interlayer a separation, Japanese Published Unexamined (Kokai) Patent Application No. 2-236014 discloses such a method of laminating a layer strengthened against torsion (of which the lamination angle is ±30° to ±60° with respect to the axial direction) and the layer strengthened against bending (of which the lamination angle is 0° to 20°) alternately, in order to suppress the interlayer separation due to a difference in the thermal expansion coefficient between the conditions when heated for curing and when cooled to the room temperature.

Further, Japanese Published Unexamined (Kokai) Patent Application No. 6-335973 discloses a method of using high frequency induction heating means, to reduce the temperature dispersion while heating for curing and thereby to decrease the internal stress thereof.

In the first prior art method of laminating plies at different lamination angles (i.e. directions), since the wall thickness of the manufacturable cylindrical parts is limited to about 15 mm, when the wall thickness thereof increases more than this value (e.g., 15 to 50 mm), the internal stress generated in the fiber reinforced plastic composite material sharply increases with increasing wall thickness, so that the interlayer separation occurs in the fiber reinforced plastic composite material layers. Therefore, it is impossible to manufacture a cylindrical structure of high strength and high rigidity by making the best use of the characteristics of the composite material.

Further, in the second prior art method of using a high frequency induction heating apparatus in order to reduce the temperature dispersion during the heat curing and thereby to reduce the internal stress generated in the fiber reinforced plastic composite material layers, since magnetic substances are added to the matrix resin, the weight thereof inevitably increases, and as the result there exists a problem in that the weight of the structural body is increased and further the performance of the structural body is degraded. In this method, additionally there exists another problem in that a special high frequency induction heating facility must be prepared in accordance with the shape of the manufactured structural body, instead of an autoclave or a heating furnace.

Further, when a mandrel formed of steel (thermal expansion coefficient: 10 to $12\times10^{-6}/°C$.) is used, since the mandrel is shrunk when cooled after heat curing, there exists a problem in that the inside layers are shrunk in the radial direction thereof and thereby the interlayer separation often occurs.

SUMMARY OF THE INVENTION

With these problems in mind, therefore, it is an object of the present invention to provide a method of manufacturing a thick-walled (e.g., 40 mm) cylindrical part having a stable quality by use of fiber reinforced plastic composite material, by reducing the internal stress thereof, while using conventional equipment.

To achieve the above-mentioned object, the present invention provides a method of manufacturing the cylindrical part by fiber reinforced plastic composite material, which includes the step of laminating a fiber reinforced plastic composite material with an elastic modulus on a mandrel, winding a different kind of said composite material with another elastic modulus on said fiber reinforced plastic composite material, repeating alternately said laminating and said winding, curing both of said materials, and deriving a fiber reinforced plastic product without deformation due to internal stress after cooling down and taking out said mandrel.

Further, the present invention provides a method of manufacturing the cylindrical part by the fiber reinforced plastic composite material, comprising the steps of: laminating a fiber reinforced plastic composite material having a small thermal expansion coefficient in a circumferential direction of a metallic mandrel; heating the laminated fiber reinforced plastic composite material for curing, to form an auxiliary member; laminating another fiber reinforced plastic composite material on an outer side of the formed auxiliary member; and heating the formed laminated fiber reinforced plastic composite material for curing.

Further, the present invention provides a method of manufacturing a thick-walled cylindrical part by fiber reinforced plastic composite material, comprising the steps of: laminating a fiber reinforced plastic composite material having a small thermal expansion coefficient in a circumferential direction of a mandrel; heat-curing the laminated composite material under first heating conditions to form an auxiliary member; covering the formed auxiliary member with a thin film of high heat resistance; laminating another fiber reinforced plastic composite material on the thin film covering the auxiliary member, to form a first fiber reinforced plastic composite material layer; laminating another fiber reinforced plastic composite material having an elastic modulus smaller than that of the fiber reinforced plastic composite material of the first fiber reinforced plastic composite material layer, on the formed first fiber reinforced plastic composite material layer, to form a second fiber reinforced plastic composite material layer; laminating another fiber reinforced plastic composite material the same as that of the first fiber reinforced plastic composite material layer, on the formed second fiber reinforced plastic composite material layer, to form a third fiber reinforced plastic composite material layer; laminating another fiber reinforced plastic composite material the same as that of the second fiber reinforced plastic composite material layer and another fiber reinforced plastic composite material the same as that of the third fiber reinforced plastic composite material layer, alternately by a predetermined times, on the formed third fiber reinforced plastic composite material layer; compaction-processing all the laminated fiber reinforced plastic composite material layers under second heating conditions at a temperature lower than and for a time shorter than those of the first heating conditions, to form a strength member; laminating another fiber reinforced plastic composite material the same as that of the second fiber reinforced plastic composite material layer and another fiber reinforced plastic composite material the same as that of the third fiber reinforced plastic composite material layer, alternately by a predetermined times, on the formed strength member; compaction-processing all the laminated fiber reinforced plastic composite material layers under the second heating conditions, to form another strength member; laminating another fiber reinforced plastic composite material the same as that of the second fiber reinforced plastic composite material layer and another fiber reinforced plastic composite material the same as that of the third fiber reinforced plastic composite material layer, alternately by a predetermined times, on the formed strength member, to form a thick-walled cylindrical body having a predetermined thickness on the formed strength member; and heat-curing all the laminated fiber reinforced plastic composite material layers under the first heating conditions.

Further, the present invention provides a thick-walled cylindrical part manufactured by the fiber reinforced plastic composite material which includes a plurality of sorts of fiber reinforced plastic composite materials which have a different elastic modulus and are alternately laminated respectively.

In the method of manufacturing the thick-walled cylindrical part by composite material according to the present invention, in order to reduce the internal stress generated in the fiber reinforced plastic composite material layer after heat curing, when the major material of the thick-walled cylindrical part is a carbon fiber reinforced plastic composite material, a cushioning material (e.g., glass or aramide fiber reinforced plastic composite material) having an elastic modulus smaller than that of the carbon fiber reinforced composite material is laminated separately about several to 20% being divided into several layers in the wall thickness direction. By these lamination layers, it is possible to reduce the internal stress generated in each layer and thereby to eliminate the interlayer separation caused after heat curing of the cylindrical part.

Further, during the lay-up processing, the laminated cylindrical part is processed for a compaction method at a temperature (e.g., 60° C. to 130° C.) lower than the curing temperature (e.g., 180° C.) for a time (e.g., 30 to 60 min.) and under pressure (e.g., vacuum to 7 kgf/cm$^2$); that is, under such conditions that no harmful influence is exerted upon the physical properties of the finally cured cylindrical part. By this compaction process, it is possible to reduce a change in the wall thickness thereof between the conditions when laid-up and after heating and to prevent the occurrence of local meandering and local wrinkles produced after heated for curing; that is, to decrease the internal stress.

Further, since the auxiliary member formed by the fiber reinforced plastic composite material layer having a small thermal expansion coefficient in the fiber direction is laminated inside the strength member required to increase the strength and the rigidity, it is possible to prevent the inner layers from being shrunk after the strength member is once heated for curing and then cooled, so that the interlayer separation of the thick-walled cylindrical part can be prevented. Here, as the composite material used for this purpose, the carbon fiber reinforced plastic composite material having a roughly zero thermal expansion coefficient in the fiber direction is suitably used.

Further, since the occurrence of the internal stress is proportional to the difference between the curing temperature and the room temperature, it is possible to reduce the temperature difference between the conditions when heated for curing and when cooled by reducing the curing temperature within such a range that the performance is not degraded as compared with the case obtained in the conventional curing cycle. As a result, it is possible to reduce the internal stress after the heat curing.

Further, according to the wall thickness and the usage, it is possible to suppress the occurrence of the internal stress by changing the lamination direction of the fiber reinforced plastic composite material.

BRIEF DESCRIPTION OF THE DRAWINGS

FIG. 1 is a side view showing a mandrel used for the method of manufacturing a thick-walled cylinder part by fiber reinforced plastic composite material according to the present invention;

FIG. 2 is an illustration for assistance in explaining a first process of manufacturing the thick-walled cylinder part by the fiber reinforced plastic composite material according to the present invention;

DETAILED DESCRIPTION OF THE PREFERRED EMBODIMENTS

The present invention will be described hereinbelow with reference to the attached drawings.

FIG. 1 shows a forming mandrel used for the method of forming a thick-walled cylinder part by a fiber reinforced plastic composite material according to the present invention. The mandrel 1 is formed of steel material (thermal expansion coefficient: 10 to $12 \times 10^{-6}/°C.$). Further, the forming mandrel 1 is formed with a small taper extending from one end to the other end thereof on an outer surface 1a thereof, to facilitate removal of the cylindrical parts from the mandrel 1 after heat curing.

Figure 6:
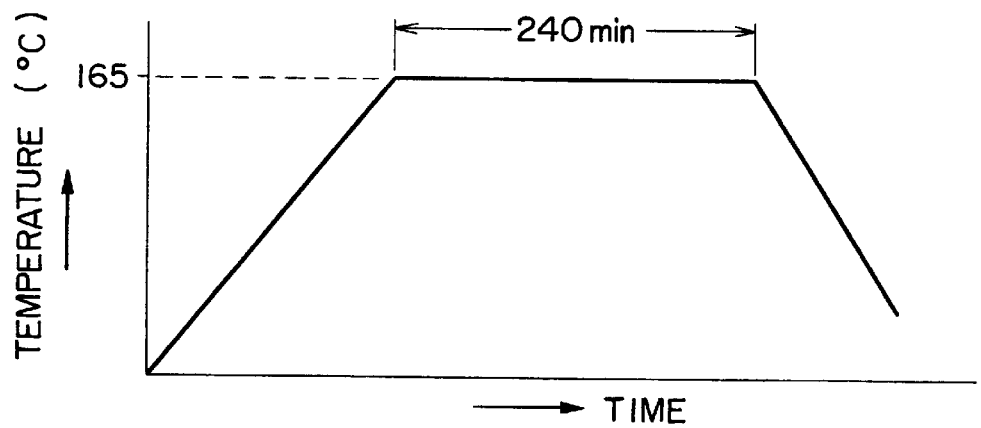
FIG. 6 is a graphical representation showing a curing cycle of the method of manufacturing the thick-walled cylinder part by the fiber reinforced plastic composite material according to the present invention.

As shown in FIG. 2, a carbon fiber reinforced plastic composite material (CFRP) 2a is laid up on the outer surface 1a of the forming mandrel 1 at an angle θ (about 90 degrees) and with a radial thickness of about several millimeters (about 3 to 5 mm) in such a way that the wall thickness can be changed so as to cancel the tapered surface on the outer surface 1a of the forming mandrel 1. The carbon fiber reinforced plastic composite material (CFRP) 2a laid up on the outer surface 1a of the forming mandrel 1 is heated for curing (i.e., hot setting) in a curing cycle as shown in FIG. 6; that is, at 165° C. for 240 min.. The heated carbon fiber reinforced composite material 2a is formed as an auxiliary member 2. The conventional curing cycle (e.g., at 180° C. for 120 min.) can be adopted, instead of the curing cycle shown in FIG. 6.

On the auxiliary member 2 laid up on the forming mandrel 1, a thin film (not shown) of high heat resistance (e.g., Teflon tape ("Teflon" is the trademark for polytetrafluoroethylene)) is wound so as to cover all over the surface of the auxiliary member 2. This thin film is used to perfectly separate the auxiliary member 2 from a strength member 3 to be laid up on the auxiliary member 2.

When the laminating direction of the carbon fiber reinforced plastic composite material of the strength member 3 differs, the thermal expansion coefficient thereof differs according to the fiber direction of the carbon fiber reinforced plastic composite material. For instance, in the case of the carbon fiber reinforced plastic composite material, the thermal expansion coefficient in the fiber extending direction is almost zero due to a strong influence of the carbon fiber. However, since the influence of the carbon fiber is weak in the direction perpendicular to the carbon fiber, the thermal expansion coefficient in this perpendicular direction is relatively large due to a strong influence of the matrix resin. Therefore, when the carbon fiber reinforced plastic composite material is cooled from the curing temperature to the room temperature, as far as there exists a difference in the lamination direction between the formed strength members 3, the internal stress (strain) increases due to difference in thermal expansion between the strength members 3, so that there exists the case where the strength members 3 are separated from each other. Therefore, it is possible to obtain cylindrical parts having a thicker wall by decreasing the difference in the laminating direction between the strength members 3.

Figure 3:
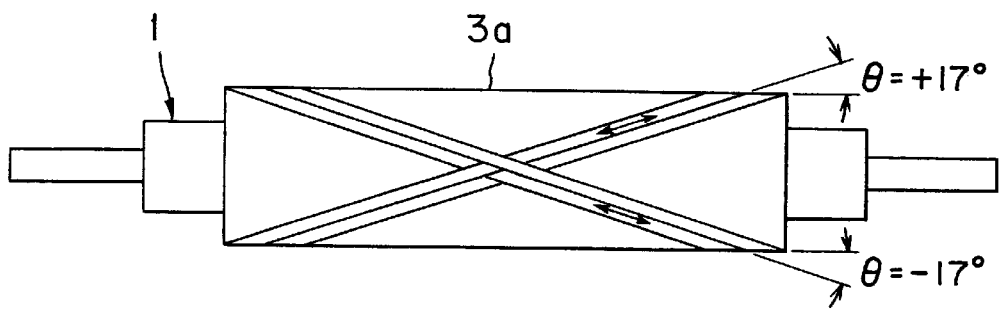
FIG. 3 is an illustration for assistance in explaining a second process of manufacturing the thick-walled cylinder part by the fiber reinforced plastic composite material according to the present invention.
Figure 4:
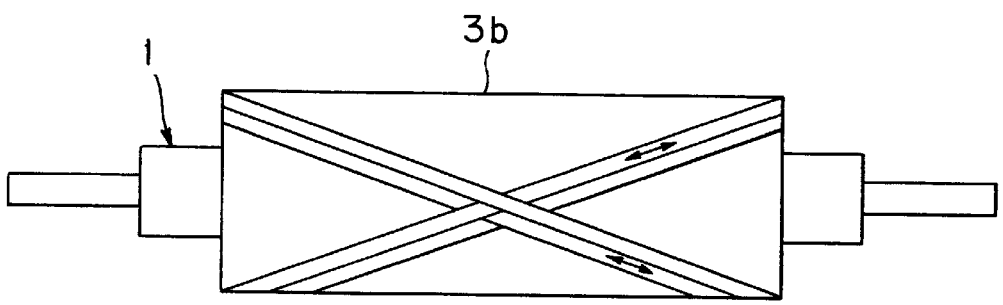
FIG. 4 is an illustration for assistance in explaining a third process of manufacturing the thick-walled cylinder part by the fiber reinforced plastic composite material according to the present invention.
Figure 5:
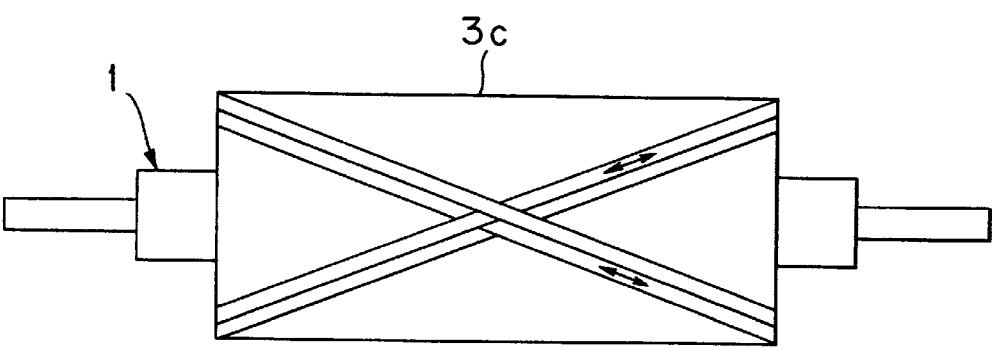
FIG. 5 is an illustration for assistance in explaining a fourth process of manufacturing the thick-walled cylinder part by the fiber reinforced plastic composite material according to the present invention.

The strength members 3 laid-up on the auxiliary member 2 can be formed in accordance with the three-stage process as shown in FIGS. 3 to 5.

In more detail, as shown in FIG. 3, on the auxiliary member (e.g., Teflon tape ("Teflon" is the trademark for polytetrafluoroethylene)) 2 laid up on the forming mandrel 1, a strength member 3a (which corresponds to ⅓ of all the plies) composed of the carbon fiber reinforced plastic composite material and a glass fiber reinforced plastic composite material (as a cushioning composite material) is laid up in the laminating direction of ±17 degrees with respect to the axial line of the forming mandrel 1.

In the case where the external force applied to the cylindrical axis is almost bending, tension and compression without including torsion, it may be considered that the cylindrical part of high strength can be obtained when the laminating direction is determined nearly in the axial direction. In this case, however, it is difficult to conduct the lamination work of the fiber reinforced plastic composite material. Here, as far as the strength and the rigidity can be both secured, it is preferable to determine the laminating direction away from the axial direction from the standpoint of the productivity. Therefore, a uniform lamination direction of ±17 degrees was set on condition that the necessary strength and necessary rigidity can be both secured and further the lamination work can be facilitated under a given condition. However, without being limited only to this angle, this laminating direction can be changed at need.

The proportion of the carbon fiber reinforced plastic composite material as a major material and the glass fiber reinforced plastic composite material as a cushioning material can be decided in accordance with a complex rule so as to satisfy the required strength and elastic modulus.

In the case of the carbon fiber reinforced plastic composite material and the glass fiber reinforced plastic composite material, there exists a small difference in strength between both. However, there exists a big difference in elastic modulus between both. Therefore, the ratio of the carbon fiber reinforced plastic composite material to the glass fiber reinforced plastic composite material was determined as 9:1, in accordance with the following complex rule of the elastic modulus, so that the elastic modulus can satisfy the requested value:

$$E = Er \times Vr + Eb \times Vb$$

where E=requested elastic modulus

Er=elastic modulus of strength member

Eb=elastic modulus of cushioning material

Vr=volumetric proportion of strength member

Vb=volumetric proportion of cushioning material

The strength member 3a laid up on the auxiliary member 2 of the forming mandrel 1 is processed for compaction at 100° C. under 6 $kgf/cm^2$ for 30 min., in order to secure the cylindrical shape and to prevent the occurrence of the local meandering and local wrinkles.

After that, as shown in FIG. 4, on the strength member 3a laid up on the forming mandrel 1, another strength member 3b of about ⅓ of all the plies is further laid up. The strength member 3b laid up on the strength member 3a is processed for compaction at 100° C. under 6 $kgf/cm^2$ for 30 min., in order to secure the cylindricity and to prevent the occurrence of the local meandering and local wrinkles.

Further, as shown in FIG. 5, on the strength member 3b laid up on the forming mandrel 1, the other strength member 3c of about ⅓ of all the plies is further laid up. The strength member 3c laid up on the strength member 3b is heated for curing at 165°0 C. for 240 min., in order to obtain a cylindrical part having a thick wall and manufactured by the carbon fiber reinforced plastic composite material.

The above-mentioned compaction conditions (pressure, temperature, time, the number of times) are determined within a range in which no harmful influence is exerted upon the physical properties of the cylindrical part having a thick wall manufactured by the composite material and cured finally.

As described above, in the above-mentioned preferred embodiment of the manufacturing method according to the present invention, when the strength member 3 is formed, the fiber reinforced plastic composite material for forming the strength member 3 is laminated three times separately. Here, one layer of the glass fiber reinforced plastic composite material is laid up between the fiber reinforced plastic composite material at regular intervals. In addition, after the first and second lamination process, the strength member 3 is processed for compaction at 100° C. under 6 kgf/cm² for 30 min..

Further, in the preferred embodiment of the manufacturing method according to the present invention, the number of the laminations of the strength members 3 and the compaction processing timings are as follows:

8-laminations of the fiber reinforced plastic composite material→1-lamination of the glass fiber reinforced plastic composite material→9-laminations of the fiber reinforced plastic composite material→1-lamination of the glass fiber reinforced plastic composite material→8-laminations of the fiber reinforced plastic composite material→compaction processing →1-lamination of the fiber reinforced plastic composite material→1lamination of the glass fiber reinforced plastic composite material→9-laminations of the fiber reinforced plastic composite material→1-lamination of the glass fiber reinforced plastic composite material→9-laminations of the fiber reinforced plastic composite material→1-lamination of the glass fiber reinforced plastic composite material→5-laminations of the fiber reinforced plastic composite material→compaction processing →4-laminations of the fiber reinforced plastic composite material→1-lamination of the glass fiber reinforced plastic composite material→9-laminations of the fiber reinforced plastic composite material→1-lamination of the glass fiber reinforced plastic composite material→9-laminations of the fiber reinforced plastic composite material→1-lamination of the glass fiber reinforced plastic composite material→3-laminations of the fiber reinforced plastic composite material→heat curing processing.

In this embodiment, after the third lamination, the cylindrical part was heated for curing at 165° C. under 6 kgf/cm² for 240 min. This temperature condition is lower than that of the conventional conditions as 180° C. under 6 kgf/cm² for 120 min.. Since the heat curing temperature is lowered, the difference between the heating temperature and the room temperature can be reduced, so that the thermal stress can be decreased. Further, it was confirmed that the performance of the composite material is not changed due to the change in curing conditions. In more details, test pieces were heat-cured at 165° C. for 240 min., and further it was confirmed that these test pieces were not changed at the glass transition point temperature. Further, it was confirmed that the non-reactive substance contained in the test piece was equivalent to that of a test piece cured at 180° C. for 120 min., by measuring the water absorption quantity of these test pieces. In addition, the same test pieces to each of which the final heat-curing process was made were tested for strength. It was confirmed that the strength was not reduced. On the basis of the above-mentioned confirmations, the final heat-curing conditions were decided.

The above-mentioned compaction processing is made to secure the true cylindrical shape and to prevent the occurrence of local meandering and local wrinkles. These conditions can be decided within a range where the physical properties of the composite material do not deteriorate after the final heat curing, on the basis of such a temperature standard that the plastic begins to flow and such time standard that the plastic is not yet cured by heat. In other words, the conditions of the compaction processing decided on the basis of the property examination of the plastic after compaction processing and the strength test results of the plastic after the final heat-curing. The decided compaction conditions are as follows: the temperature is 60 to 130° C., and the pressure is 3 to 6 kgf/cm² of the ordinary heat curing conditions.

Table 1 lists the relationship between the curing conditions and the physical properties.

TABLE 1

| CURING CONDITIONS AND PROPERTIES | | | | |
|---|---|---|---|---|
| CURING CONDITIONS | BENDING STRENGTH (kgf/mm²) | BENDING MODULUS (kgf/mm²) | GLASS TRANSIT TEMP Tg (° C.) | WATER ABSORB RATIO (%) |
| 180° C. × 120 min. | 213 | 12,300 | 195 | 0.43 |
| 165° C. × 240 min. | 206 | 12,300 | 191 | 0.41 |

On the basis of the above-mentioned measurement results, in the curing cycle of the present invention (curing time: 240 min.; curing temp: 165 ° C.), the performance equivalent to that of the conventional curing cycle (curing time: 120 min.; curing temp: 180 ° C.) was obtained. As a result, it was possible to reduce the temperature difference between the curing temperature and the room temperature.

In the thick-walled cylindrical part manufactured by fiber reinforced plastic composite material according to the present invention, the major material is the carbon fiber reinforced plastic (CFRP) and the cushioning material is glass fiber reinforced plastic (GFRP). The proportion of both is 9:1 on the basis of the requirement of strength and rigidity. Further, the lamination orientation is of unidirection of ±17° (100%). This unidirectional lamination orientation has the bending strength and the rigidity both equivalent to those of the cylindrical parts manufactured by the composite material having the lamination orientation of ±10° (65%)/±45° (25%)/±85° (10%).

Figure 7:
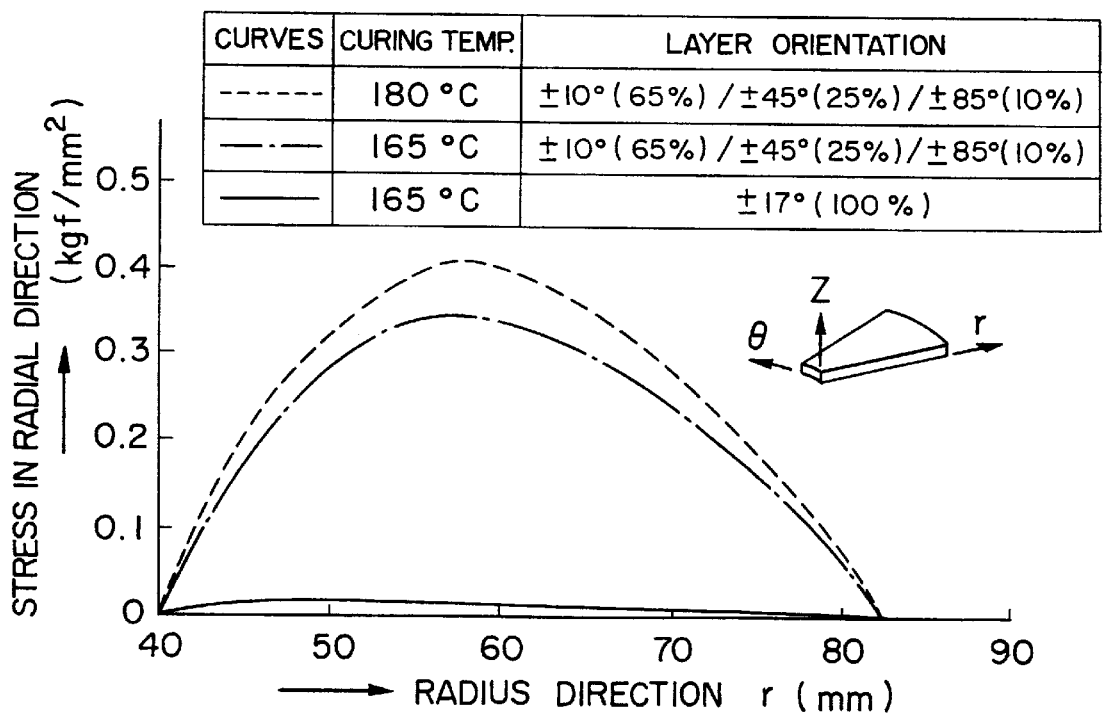
FIG. 7 is a graphical representation showing analysis results of the internal stress of the thick-walled cylinder part manufactured by the fiber reinforced plastic composite material according to the present invention.

FIG. 7 shows the analysis results (NASTRAN) of the internal stress of the thick-walled cylindrical part manufactured by composite material, which are obtained after cured in the curing cycle.

In FIG. 7, a solid curve shows an internal stress change obtained by the thick-walled cylindrical part manufactured by composite material having the lamination orientation of the unidirection of ±17° (100%) and the curing temperature of 165° C.; a dashed-line curve shows an internal stress change obtained by the thick-walled cylindrical part manufactured by composite material having the lamination orientation of ±10° (65%)/±45° (25%)/±85° (10%) and the curing temperature of 180° C.; and a dot-dashed-line curve shows an internal stress change obtained by the thick-walled cylindrical part manufactured by composite material having the lamination orientation of ±10° (65%)/±45° (25%)/±85° (10%) and the curing temperature of 165° C.

Here, the proportion of the carbon fiber reinforced plastic composite material to the glass fiber reinforced plastic composite material both for forming the lamination orientation of the thick-walled cylindrical part manufactured by composite material is 9:1.

In the thick-walled cylindrical part manufactured by composite material having the lamination orientation of ±10° (65%)/±45° (25%)/±85° (10%), the lamination directions of ±10° and ±45° are applied to the carbon fiber reinforced plastic composite material and the laminating direction of ±85° is applied to the glass fiber reinforced plastic composite material. Further, the number of the laminations and the timings of the compaction process are as follows:

±10° 5-laminations→±45° 1-lamination→±85°
1-lamination→±45° 1-lamination→±10°
6-laminations→±45° 1-lamination→±85°
1-layer→±45°            1-lamination→±10°
6-laminations→±45° 1-lamination→85°
1-layer→±45°            1-lamination→10°
2-laminations→compaction
→±10° 4-laminations→±45° 1-lamination→±85°
1-lamination→±45° 1-lamination→±10°
6-laminations→±45°1-lamination→±85°
1-lamination→±45° 1-lamination→±10°
6-laminations→±45° 1-lamination→±85°
1-lamination→±45° 1-lamination→10°
2-laminations→compaction
→±10° 4-laminations→±45°1-lamination→±85°
1-lamination→±45° 1-lamination→±10°
6-laminations→±45° 1-lamination→±85°
1-lamination→±45° 1-lamination→±10°
6-laminations→±45° 1-lamination→85°
1-lamination→45° 3-laminations→final curing FIG. 7 indicates that in the case of the thick-walled cylindrical part manufactured by composite material as shown by the solid line curve, it is possible to reduce the internal stress largely by reducing the curing temperature and by determining only one laminating direction.

Table 2 lists the experimental results of the interlayer separation of the thick-walled cylindrical part manufactured by the method according to the present invention, in comparison with those of the interlayer separation manufactured by the other methods.

TABLE 2

PRESENCE OR ABSENCE OF INTERLAYER SEPARATION ACCORDING TO MANUFACTURING METHODS

| NO | T | A | B | C | D | LAMINATION ORIENTATION | E |
|----|----|-----|-----|-----|-----|------------------------|-----|
| 1  | 11 | NO  | NO  | NO  | 180 | ±10°/±45°/±85°         | NO  |
| 2  | 30 | NO  | NO  | NO  | 180 | ±10°/±45°/±85°         | YES |
| 3  | 30 | YES | YES | NO  | 180 | ±10°/±45°/±85°         | NO  |
| 4  | 42 | YES | YES | NO  | 180 | ±10°/±45°/±85°         | YES |
| 5  | 42 | YES | YES | YES | 165 | ±10°/±45°/±85°         | YES |
| 6  | 42 | YES | YES | YES | 165 | ±17°                   | NO  |

T: THICKNESS (mm)
A: APPLICATION OF CUSHIONING MATERIAL
B: APPLICATION OF HEAT COMPACTION
C: APPLICATION OF AUXILIARY MEMBER
D: CURING TEMPERATURE (° C.)
E: PRESENCE OF INTERLAYER SEPARATION
YES: APPLIED, NO: NOT APPLIED

The above-mentioned experiment results indicate that in the case of the wall thickness of 11 mm (No. 1), the interlayer separation did not occur when no special method was adopted.

In the case of the wall thickness of 30 mm (No. 2), the interlayer separation occurred at roughly the middle of the wall thickness.

In the case of the wall thickness of 30 mm (No. 3), the interlayer separation did not occur because the cushioning material was applied and further the heat compaction process was made.

In this case, the number of the laminated laminations of the strength member of the thick-walled cylindrical part and the timing of the compaction processing were as follows: Further, the laminating directions of ±10° and ±45° were applied to the carbon fiber reinforced plastic composite material and the lamination direction of ±85° was applied to the glass fiber reinforced plastic composite material.

±10° 5-layers→±45° 1-layer → 85° 1-layer → ±45°
1-layer ±10° 6-layers→±45° 1-layer→±85° 1-layer→±45°
1-layer→±10° 6-layers→±45° 1-layer→±85°1-layer→±45°
1-layer→10° 2-layers→compaction
→±10° 4-layers→±45° 1-layer→±85° 1-layer→±45°
1-layer→±10° 6-layers→±45° 1-layer→±85°
1-layer→±45° 1-layer→±10° 6-layers→±45°
1-layer→±85° 1-layer→±45° 1-layer→±10° 2-layers final curing Further, in the case of the wall thickness of 42 mm (No. 4), although the cushioning material was applied and further the heat compaction was made, the interlayer separation occurred almost all over the circumference and length thereof at roughly the middle of the wall thickness.

In the case of the wall thickness of 42 mm (No. 5), although the cushioning material was applied; the heat compaction process was made; the auxiliary member was applied; and further the curing temperature was lowered from 180° C. to 165° C., the interlayer separation occurred locally.

Further, the number of laminated layers and the compaction timing of the wall thickness of 42 mm (No. 4 and No. 5) are the same as with the case shown by the dashed curve or the dot-dashed curve line in FIG. 7.

In the case of the wall thickness of 42 mm (No. 6) according to the present invention, the laminating orientation was of unidirection of ±17°; the cushioning material was applied; the heat compaction process was made; the auxiliary member was applied; and further the curing temperature was lowered to 165° C. Therefore, it was possible to obtain the cylindrical parts of excellent quality having no interlayer separation.

Further, in the case of such a laminating method that: the carbon fiber reinforced plastic composite material having the laminating directions of ±10° and ±45° and the glass fiber reinforced plastic composite material having the laminating direction of ±85° are combined with the heat compaction process, without use of the unidirectional lamination; the auxiliary member is not used; and the final heat curing temperature is not changed, it is possible to obtain the 30-mm thick cylindrical part having no interlayer separation. In this cylindrical parts, since the carbon fiber is arranged in the laminating direction of ±45°, the thick-walled cylindrical part is strong against both the bending and torsion.

The present invention has been explained by taking the case where the internal diameter of the cylindrical part is decoded as 80 mm (radius: 40 mm) as shown in FIG. 7. However, the limit of the wall thickness is not yet confirmed. Therefore, when the limit of the wall thickness is confirmed, it may be possible to obtain the thick-walled cylindrical part other than those as listed in Table 2. Further, when the internal diameter of the cylindrical part changes, even if the wall thickness is not changed, the internal stress differs. Therefore, when the manufacturing method according to the present invention is adopted by changing the internal diameter of the cylindrical part, it may be possible to obtain the cylindrical part having the wall thickness partially different from the values as listed in Table 2. For instance, when the internal diameter is larger than 80 mm, since the internal stress is reduced, it is possible to obtain the cylindrical part having the wall thickness larger than that obtained conventionally when the internal diameter is 80 mm. Therefore, the technical scope of the present invention includes the manufacturing method in which the internal diameter is changed, without being limited to only the internal diameter of 80 mm.

As described above, in the method according to the present invention, it is possible to manufacture the thick-walled cylindrical part having an excellent quality, by using the fiber reinforced plastic composite material, and by reducing the internal stress generated after the heat curing process.

While the presently preferred embodiments of the present invention have been shown and described, it is to be understood that the disclosures are for the purpose of illustration and that various changes and modification may be made without departing from the scope of the invention as set forth in the appended claims.

What is claimed is:

1. A method of manufacturing a cylindrically-shaped article, comprising:
   (a) winding a first fiber reinforced plastics material having a first elastic modulus onto a mandrel to form at least one layer of the first fiber reinforced plastics material;
   (b) winding a second fiber reinforced plastics material having a second elastic modulus less than the first elastic modulus onto the at least one layer of the first fiber reinforced plastics material to form at least one layer of the second fiber reinforced plastics material, such that a number of layers of the first fiber reinforced plastics material is equal to or greater than a number of layers of the second fiber reinforced plastics material; and
   (c) repeating steps (a) and (b) at least once to thereby form subsequent layers of the first and second fiber reinforced plastics materials,
   wherein the first and second fiber reinforced plastics materials are wound at an angle of approximately ±17° with respect to an axial direction of the mandrel for forming the internal diameter of the cylindrical part with at least 40 mm thickness.

2. A method of manufacturing a cylindrically-shaped article with a first fiber reinforced plastic material having a first elastic modulus and a second fiber reinforced plastic material having a second elastic modulus less than the first elastic modulus, said method comprising the steps of:
   laminating five laminations of the first fiber reinforced plastic material at a laminating direction of ±10° to an axial direction of the cylindrically-shaped article;
   laminating one lamination of the first fiber reinforced plastic material at a laminating direction of ±45° to the axial direction of the cylindrically-shaped article;
   laminating one lamination of the second fiber reinforced plastic material time at a laminating direction of ±85° to the axial direction of the cylindrically-shaped article;
   laminating one lamination of the first fiber reinforced plastic material at a laminating direction of ±45° to the axial direction of the cylindrically-shaped article;
   laminating six laminations of the first fiber reinforced plastic material at a laminating direction of ±10° to the axial direction of the cylindrically-shaped article;
   laminating one lamination of the first fiber reinforced plastic material at a laminating direction of ±45° to the axial direction of the cylindrically-shaped article;
   laminating one lamination of the second fiber reinforced plastic material at a laminating direction of ±85° to the axial direction of the cylindrically-shaped article;
   laminating one lamination of the first fiber reinforced plastic material at a laminating direction of ±45° to the axial direction of the cylindrically-shaped article;
   laminating six laminations of the first fiber reinforced plastic material at a laminating direction of ±10° to the axial direction of the cylindrically-shaped article;
   laminating one lamination of the first fiber reinforced plastic material at a laminating direction of ±45° to the axial direction of the cylindrically-shaped article;
   laminating one lamination of the second fiber reinforced plastic material at a laminating direction of ±85° to the axial direction of the cylindrically-shaped article;
   laminating one lamination of the first fiber reinforced plastic material at a laminating direction of ±45° to the axial direction of the cylindrically-shaped article;
   laminating two laminations of the first fiber reinforced plastic material at a laminating direction of ±10° to the axial direction of the cylidrically-shaped article;
   executing a compaction process;
   laminating four laminations of the first fiber reinforced plastic material at a laminating direction of ±10° to the axial direction of the cylindrically-shaped article;
   laminating the one lamination of the first fiber reinforced plastic material at a laminating direction of ±45° to the axial direction of the cylindrically-shaped article;
   laminating one lamination of the second fiber reinforced plastic material at a laminating direction of ±85° to the axial direction of the cylindrically-shaped article;
   laminating one lamination of the first fiber reinforced plastic material at a laminating direction of ±45to the axial direction of the cylindrically-shaped article;
   laminating six laminations of the first fiber reinforced plastic material at a laminating direction of ±10° to the axial direction of the cylindrically-shaped article;
   laminating one lamination of the first fiber reinforced plastic material at a laminating direction of ±45° to the axial direction of the cylindrically-shaped article;
   laminating one lamination of the second fiber reinforced plastic material at a laminating direction of ±85° to the axial direction of the cylindrically-shaped article;
   laminating one lamination of the first fiber reinforced plastic material at a laminating direction of ±45° to the axial direction of the cylindrically-shaped article;
   laminating six laminations of the first fiber reinforced plastic material at a laminating direction of ±10° to the axial direction of the cylindrically-shaped article;
   laminating one lamination of the first fiber reinforced plastic material at a laminating direction of ±45° to the axial direction of the cylindrically-shaped article;
   laminating one lamination of the second fiber reinforced plastic material at a laminating; direction of ±85° to the axial direction of the cylindrically-shaped article;
   laminating one lamination of the first fiber reinforced plastic material at a laminating direction of ±45° to the axial direction of the cylindrically-shaped article;
   laminating two laminations of the first fiber reinforced plastic material at a laminating direction of ±10° to the axial direction of the cylindrically-shaped article;
   executing a compaction process;
   laminating four laminations of the first fiber reinforced plastic material at a laminating direction of ±10° to the axial direction of the cylindrically-shaped article;

laminating one lamination of the first fiber reinforced plastic material at a laminating direction of ±45° to the axial direction of the cylindrically-shaped article;

laminating one lamination of the second fiber reinforced plastic material at a laminating direction of ±85° to the axial direction of the cylindrically-shaped article;

laminating one lamination of the first fiber reinforced plastic material at a laminating direction of ±45° to the axial direction of the cylindrically-shaped article;

laminating six laminations of the first fiber reinforced plastic material at a laminating direction of ±10° to the axial direction of the cylindrically-shaped article;

laminating one lamination of the first fiber reinforced plastic material at a laminating direction of ±45° to the axial direction of the cylindrically-shaped article;

laminating one lamination of the second fiber reinforced plastic material at a laminating direction of ±85° to the axial direction of the cylindrically-shaped article;

laminating one lamination of the first fiber reinforced plastic material at a laminating direction of ±45° to the axial direction of the cylindrically-shaped article;

laminating six laminations of the first fiber reinforced plastic material at a laminating direction of ±10° to the axial direction of the cylindrically-shaped article;

laminating one lamination of the first fiber reinforced plastic material at a laminating direction of ±45° to the axial direction of the cylindrically-shaped article;

laminating one lamination of the second fiber reinforced plastic material at a laminating direction of ±85° to the axial direction of the cylindrically-shaped article;

laminating three laminations of the first fiber reinforced plastic material at a laminating direction of ±45° to the axial direction of the cylindrically-shaped article; and executing a final curing, such that 65% of the laminations are oriented at ±10° to the axial direction of the cylindrically-shaped article, 25% of the laminations are oriented at ±45° to the axial direction of the cylindrically-shaped article, and 10% of the laminations are oriented at ±85° to the axial direction of the cylindrically-shaped article.

3. A method of manufacturing a cylindrical-shaped article, comprising:

(a) winding a first fiber reinforced plastics material having a first elastic modulus onto a mandrel to form at least one layer of the first fiber reinforced plastics material;

(b) winding a second fiber reinforced plastics material having a second elastic modulus less than the first elastic modulus onto the at least one layer of the first fiber reinforced plastics material to form at least one layer of the second fiber reinforced plastics material, such that a number of layers of the first fiber reinforced plastics material is equal to or greater than a number of layers of the second fiber reinforced plastics material; and (c) repeating steps (a) and (b) at least once to thereby form subsequent layers of the first and second fiber reinforced plastics materials, wherein the first reinforced plastics material is wound at an angle of approximately 10° and ±45° with respect to an axial direction of the mandrel, the second fiber reinforced plastics material is wound at an angle of approximately ±85° with respect to an axial direction of the mandrel for forming the cylindrical part with at least 30 mm thickness.

4. A method of manufacturing a cylindrical-shaped article with a first fiber reinforced plastic material having a first elastic modulus and a second fiber reinforced plastic material having a second elastic modulus less than the first elastic modulus, said method comprising the step of:

laminating eight laminations of the first fiber reinforced plastic material;

laminating one laminations of the second fiber reinforced plastic material;

laminating nine laminations of the first fiber reinforced plastic material;

laminating one lamination of the second fiber reinforced plastic material;

laminating eight laminations of the first fiber reinforced plastic material;

executing a compaction process;

laminating one lamination of the first fiber reinforced plastic material;

laminating one lamination of the second fiber reinforced plastic material;

laminating nine laminations of the first fiber reinforced plastic material;

laminating one lamination of the second fiber reinforced plastic material;

laminating nine laminations of the first fiber reinforced plastic material;

laminating one lamination of the second fiber reinforced plastic material;

laminating five laminations of the first fiber reinforced plastic material;

executing a compaction process;

laminating four laminations of the first fiber reinforced plastic material;

laminating one lamination of the second fiber reinforced plastic material;

laminating nine laminations of the first fiber reinforced plastic material;

laminating one lamination of the second fiber reinforced plastic material;

laminating nine laminations of the first fiber reinforced plastic material;

laminating one lamination of the second fiber reinforced plastic material;

laminating three laminations of the first fiber reinforced plastic material; and executing a final curing, the first and second reinforced plastic materials are wound at a laminating direction of ±17° to the axial direction of the cylindrically-shaped article.

* * * * *